May 17, 1949.  S. A. SCHERBATSKOY  2,470,224
IONIZATION CHAMBER
Filed Dec. 6, 1944
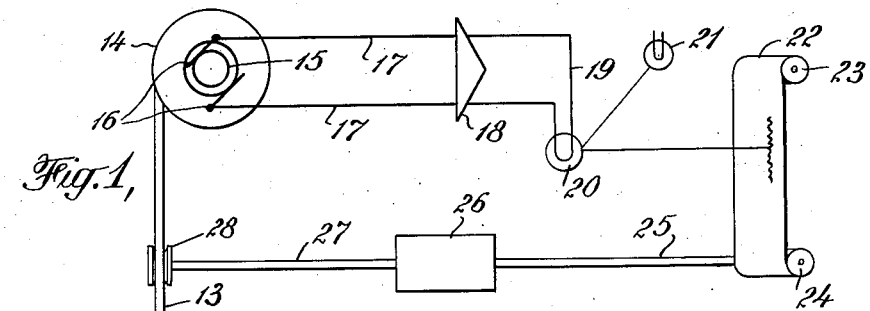
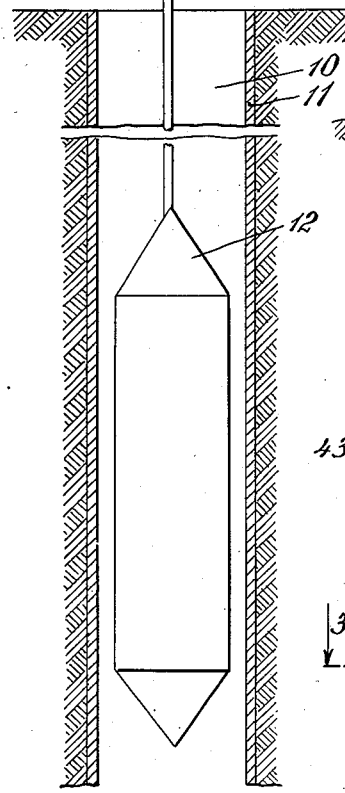
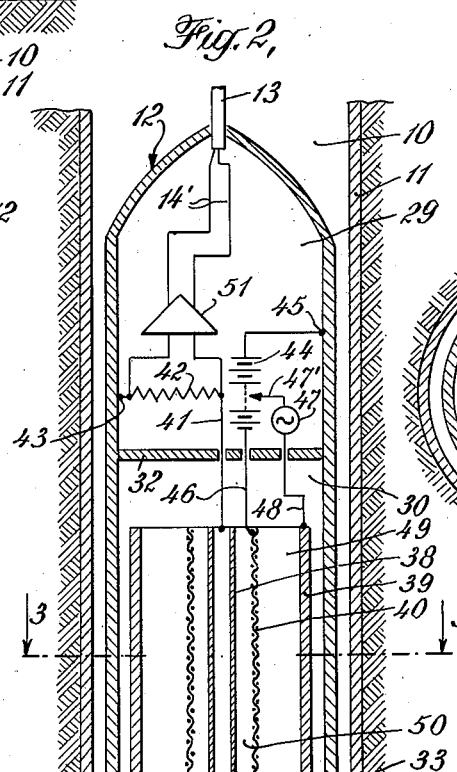
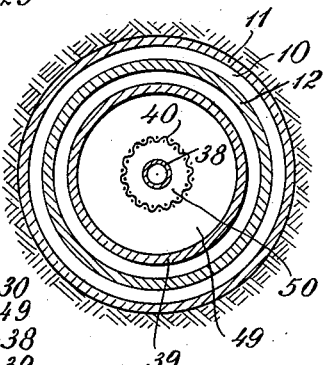
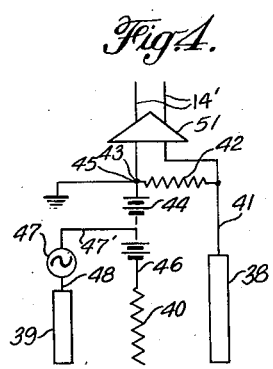
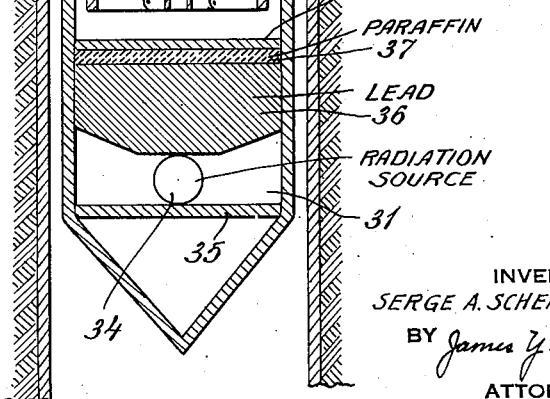
INVENTOR
SERGE A. SCHERBATSKOY
BY James Y. Cleveland
ATTORNEY Patented May 17, 1949

2,470,224

UNITED STATES PATENT OFFICE 2,470,224

IONIZATION CHAMBER

Serge Alexander Scherbatskoy, Tulsa, Okla., assignor to Well Surveys, Incorporated, Tulsa, Okla., a corporation of Delaware Application December 6, 1944, Serial No. 566,902

7 Claims. (Cl. 250—83.6)

This invention relates to a method and apparatus for geophysical exploration and particularly to a method and device for measuring radiations from radioactive materials in subsurface strata as these radiations penetrate a drill hole or well bore. In an application by Jacob Neufeld, Serial Number 161,350, filed August 27, 1937, now abandoned, bearing the title "Method of and apparatus for radioactive investigation of drill holes" and a Patent Number 2,275,456, issued March 10, 1942, to the same inventor, bearing the title "Method and apparatus for radioactive investigation of drill holes," there have been described devices which can be lowered into a well or other opening in the ground and which will detect and measure the intensity of any radiations encountered therein. In a patent to Robert E. Fearon, Number 2,308,361 issued January 12, 1943, a somewhat similar device is described, which differs in that it carries with it a source of radiations and measures the radiations scattered and returned from that source. These devices are of such a nature that they can gather important data even in a cased drill hole, that is, a drill hole which is surrounded by a steel casing of a thickness of three-eighths of an inch or greater. The devices are also so arranged that the depths to which they are lowered may be measured concomitantly with the measurements of the radiations and the two sets of measurements correlated in a single recording.

Briefly, the devices of the mentioned patents and application consist of a housing supported by a cable which extends from the housing to the surface of the ground and serves both to support the housing and to make electrical connection between the devices in the housing and the recording equipment on the surface of the ground. In the housing there is either a Geiger-Mueller counter which consists of a pair of electrodes, usually a rod surrounded by a cylinder, enclosed in an hermetically sealed compartment which contains in addition to the electrodes only a very rarefied gas, or a similar device, which may be referred to as a high pressure ionization chamber and which differs from the Geiger-Mueller counter in that it contains an inert gas such as introgen under a very high pressure, say of around 300 pounds per square inch. The Geiger-Mueller counter permits surges of current to pass through it when molecules of the gas are struck by radiations and a sufficient potential is applied across it. The high pressure ionization chamber, with sufficient potential applied across it, permits a substantially continuous current to flow the magnitude of which depends upon the intensity of the radiations.

When the Geiger-Mueller counter is used difficulty is experienced because the device must be completely stopped at various points in the well bore until the impulses of the counter have been counted for a sufficient period of time to give an accurate indication of the intensity of the radiations, or the device must be moved extremely slowly in order that the count made during the movement of the device will give a sufficient indication. The high pressure ionization chamber is an improvement in this respect in that there is a continuous current flowing and the magnitude changes rapidly in accordance with any changes in the intensity of the radiations. This permits measurements to be made while the device is being raised or lowered in a well without the necessity of making any stops or of making the movement extremely slow.

Difficulty with this latter device is encountered, however, because of the extreme accuracy with which it is desired to make measurements and the fact that the current flow is unidirectional and therefore needs to be amplified with a direct current amplifier so as to make it strong enough to send to the surface. Unfortunately, direct current amplifiers are subject to so-called "drifts" which means that the output does not bear a constant relation to the input, and this, obviously, introduces an undesirable error in the recorded measurements.

These "drifts" appear to be caused mostly by variations in the temperature at the sealed joints between the elements of the vacuum tubes and between the wires which constitute the circuit in which the tubes operate. Each of these joints constitutes a miniature thermocouple and the variation in the voltage they produce due to variations in temperature becomes quite important when the voltages to be measured are very small as they are in the present instance. Since each tube always includes a filament which is heated the temperature of the tube is always different from the temperature of its surroundings and it is practically impossible to so stabilize the temperature of the tube and its surroundings that there will not be gradual changes in temperature and accompanying variations in thermal voltages that will introduce appreciable errors into the measurements.

In addition to the "drifts" already mentioned there is an additional source of error which can be termed "direct current microphonics." When an electron tube is given a jar the elements are deformed and this deformation causes variations to appear in the current output. These variations are usually termed "alternating current microphonics" and contain frequencies in the vicinity of the natural frequencies of the various elements in the tubes. In addition to these microphonics there is a certain amount of permanent deformation that is suffered by the elements when they are subjected to shock. This permanent deformation causes a permanent change in the space current after each shock. This is often called "direct current microphonics."

It has been found that in practice the thermal current changes and other variations in a direct current amplifier than those caused by shock can be kept from having an effect greater than that which would be caused by a change of about one-tenth millivolt per minute on the grid of the first tube, but that in the best possible design the direct current microphonics caused by modest tapping of the amplifiers with the forefinger is at least five times that magnitude, having the same effect as would be caused by changing the voltage on the grid of the first tube about one-half of a millivolt per minute. Since the thermal drift will occur more or less continuously it is possible to draw a "drift" curve and consequently to at least partially take into account the errors caused thereby. Microphonics, however, are caused by erratic influences and consequently it is impossible to compensate for such changes in a similar manner.

The present invention overcomes these important difficulties and permits much more accurate determinations to be made without interference by the sources of error mentioned above. This improvement is accomplished by placing a grid in the ionization chamber between the two electrodes thereof and impressing on the grid a steady potential that is supplied by a battery. The outer of the two electrodes between which the grid is put has an alternating potential impressed upon it. The resultant output of the ionization chamber (received on the central electrode) will contain an alternating current component that has the current resulting from detected radiations impressed thereon. The output of the ionization chamber can therefore be applied directly to the terminals of an alternating current amplifier, the output of which is carried to the surface and recorded.

Such a method and apparatus can be used in connection with any device of the general type of these disclosed in the Neufeld and Fearon patents and the Neufeld application mentioned above whether they operate upon the natural radioactivity of the surrounding strata, or upon radiations which originate with, or are caused by, radioactive materials or other sources of radioactivity contained in the device itself or placed in a well in other ways. Regardless of the source of the radiations or the type of device used to detect them it is necessary to transmit very small electrical variations from the device to the surface of the earth with the utmost accuracy and, according to this invention, it has been found that this can be best accomplished by generating in the ionization chamber an alternating current that is modulated by currents corresponding to the intelligence sought and thereafter amplifying it with an alternating current amplifier and using the amplified alternating current to operate the recorder on the surface. In this way the direct current "drifts," "microphonics" and other disturbances are all eliminated and a much more accurate record produced.

In the accompanying drawings a diagrammatic showing has been made of embodiments of this invention. An understanding of the detailed advantages of the invention may be gained from a study of the drawings together with the following description in which:

Figure 1 is a diagrammatic illustration of the present invention applied to radioactive well logging;

Figure 2 is an enlarged vertical section of the electrometer showing the details of the ionization chamber;

Figure 3 is a cross-sectional view taken along the line 3—3 of Figure 2 showing the conventional electrodes and grid of the ionization chamber; and Figure 4 is a wiring diagram of the electrical circuits contained in the sub-surface device.

Referring now particularly to the drawings, a drill hole 10 is shown penetrating the formation to be explored. The drill hole may be provided with a tubular metallic casing such as designated by 11. The presence of the metallic casing in the drill hole is not an essential feature of the invention. The casing is merely shown for the purpose of illustrating the conditions under which the method may be practiced and it is to be understood that the process herein described may be applied in cased as well as in uncased drill holes.

The exploratory apparatus proper consists of a housing 12 which is lowered into the bore hole by means of a cable 13, containing insulated conductors 14'. The cable has a length somewhat in excess of the length of the hole to be explored and is normally wound on a drum 14 positioned adjacent the top of the drill hole. The cable may be unwound from the drum 14 to lower the exporing apparatus into the hole and may be rewound upon the drum to raise the exploring apparatus. Signals originating in the housing 12 are conducted to the surface through means of one or more conductors carried by the cable 13. Electrical connection is made at the drum 14 to these conductors by means of slip rings 15 and brushes 16. Conductors 17 carry the signals from the brushes 16 to an amplifier 18 where they may be amplified and impressed upon a recorder, here shown as the galvanometer type.

The recorder comprises the vibrating element 19 which carries a mirror 20, a light source 21 and a moving recorder strip 22. The recorder strip is supplied from a supply roll 23 and wound on a take-up roll 24. Takeup roll 24, by means of shaft 25, gear box 26, shaft 27 and measuring wheel 28, is driven by the cable 13 in its movement into and out of the drill hole. By changing the gears in gear box 26, the recorder strip can be driven at any desired speed that will be in correlation with the depth of the surveying instrument of the drill hole.

The interior of the housing 13 is divided into three compartments, an instrument compartment 29, an ionization chamber compartment 30, and a source of radiation compartment 31, by partitions 32 and 33.

In compartment 31 there is shown a source of radiation 34 on a support 35. In order that direct radiation from the source 34 will not enter the ionization chamber compartment 30, there is provided a lead shield 36 and a paraffin shield 37. The paraffin shield is provided to absorb neutrons when a source such as radium and beryllium is used. The lead shield is provided to absorb all other radiation.

The walls defining compartment 30 define an ionization chamber which contains an ionizable medium preferably under superatmospheric pressure. The ionizable medium may be an inert gas such as nitrogen or argon. Instead of nitrogen or argon, propane, carbon disulphide or any other suitable ionizable medium may be used. Concentrically disposed about the vertical axis of the ionization chamber and within the ionization chamber are the conventional electrodes 38 and 39. In addition to the conventional electrodes there is a third electrode 40 in the form of a grid which surrounds the inner electrode but is spaced therefrom. The openings in the grid 40 must be of such an area that they will pass the ions freely and will not appreciably increase the inter-electrode capacity. Experience has taught that these openings may be as small as $\frac{1}{256}$ of a square inch. The position of the grid 40 relative to electrodes 38 and 39 is important. If it is assumed that all the ionization current, produced by radiation entering the ionization chamber, is saturated, then a big distance between the grid and the collecting electrode, the central electrode, introduces an unwanted direct current component; on the other hand these two electrodes cannot be extremely close because the inductance effects are considerable in the immediate neighborhood of the grid. Therefore, a compromise spacing must be used. Experience has shown that the grid should be placed appreciably closer to the central electrode than the outer electrode.

Current collected by the central electrode is conducted by means of conductor 41 through the resistance 42, located in the compartment 29, to ground at 43. A direct current potential is applied to the grid by means of a battery 44, also located in compartment 29, whose positive terminal is connected to ground at 45 and whose negative terminal is connected to grid 40 by means of the conductor 46. An alternating potential is supplied to the outer electrode from a source 47, located in compartment 29, through means of the conductor 48. The opposite side of the source 47 is connected as shown to the battery 44. With an arrangement of potentials on the electrodes of the ionization chamber, as shown and described, the current collected by the central electrode and which flows through resistance 42 will be pulsating or alternating current depending upon the position that the conductor leading from the A. C. potential source 47 is connected to the battery 44. With this connection at the ground end of battery 44 pulsating current is produced as follows: Ions are produced in the space 49 due to radiation entering the ionization chamber. A steady field exists in the space 50 directed, in the classical electrical sense, in the direction of the arrow. At a moment when the alternating current field is in the same direction in the space 49 as it is in the space 50 at all times, the ions which reach the openings in the grid 40 will find themselves in a field which continues to attract them toward the central electrode 38. When the alternating current field in the space 49 is momentarily opposed in its direction to the permanent direction of the electrical field in space 50, ions arriving at the holes in the grid 40 will be of the wrong electrical polarity to continue through the holes in the grid and will, therefore, not reach the central electrode 38. Thus the ionizing current will be received on the central electrode during one-half cycles referred to the voltage wave of the applied A. C. generated by the generator 47. Those one-half cycles which correspond with current flow will be the ones during which the field has the same direction on both sides of the grid 40.

The ionization chamber pulsating current flowing through the resistance 42 sets up pulsating potential that is impressed on the input of an A. C. amplifier 51. The amplified alternating current is conducted to the surface through the conductors 14' that are carried by the cable 13. Since the alternating current will vary in amplitude in accordance with the ionization produced in the ionization chamber due to radiation entering the ionizable medium, at the surface it may again be amplified by the amplifier 18 and rectified. The resulting signal is then recorded on the moving recorder strip 22 in correlation with the depth at which the radiation was detected.

By adjusting the tap 47' on the battery 44 to a point where the battery 44 will also supply a direct current potential across the outer and inner electrodes that is sufficiently high to produce ionization when the ionizable medium is subjected to radiation, the alternating potential then supplied by the source 47 will serve as a commutating potential in that in alternate cycles the alternating potential will add to the direct current potential to effect a proportional increase in ionization. On the one-half cycles of opposite polarity the alternating potential will obviously reduce the ionizing potential as supplied by the battery 44 to reduce the ionization of the ionizable medium during those one-half cycles. With such an arrangement the output current from the ionization chamber will be an alternating current varying from a constant amplitude in proportion to the intensity of the ionizing radiation entering the chamber.

In operation, the strata adjacent the drill hole are irradiated with primary radiation from the source 34 as the housing 12 traverses the drill hole. Secondary radiation is detected by the ionization chamber by producing an alternating current that varies in amplitude in accordance with the ionization produced in the ionizable medium by the secondary radiation. As explained above, this alternating current is amplified and transmitted to the surface where after rectification it is recorded in correlation with depth.

Although an application of the present invention has been described in detail in connection with a primary source of radiation, it is to be understood that the invention is equally applicable to methods which are practiced without a primary source of radiation in the measurement of the natural radio-activity of the strata adjacent the drill hole. Additionally, it is to be understood that the grid controlled ionization chamber forming the subject matter of this application has broad application and may be used wherever it is desired to detect ionizing radiation.

I claim:

1. An ionization chamber adapted for use in detecting ionizing radiation that comprises in combination a casing, an ionizable medium in said casing under superatmospheric pressure, a pair of electrodes disposed in said casing and spaced from each other, a third electrode disposed between said electrodes, means for placing a direct potential across at least two of said electrodes and means for impressing an alternating potential across the third electrode and one of the pair of electrodes, the other one of said first recited pair of electrodes being a current collecting electrode and means for conducting the current collected to a point outside the ionization chamber.

2. In an ionization chamber having a housing, outer electrode, inner electrode and an ionizable medium, the improvement which comprises a grid interposed between said conventional electrodes, separate means for impressing direct and alternating potential on said grid and inner electrode and said grid and outer electrode respectively, whereby the current output from said ionization chamber, due to ionization of the ionizable medium, will be a periodically varying current.

3. In an ionization chamber having a housing, outer electrode, inner electrode, and an ionizable medium, the improvement which comprises a grid interposed between said conventional electrodes, means for impressing a continuous potential across the grid and central electrode to establish a unidirectional field between the central electrode and the grid, means for impressing an alternating potential on the inner and outer electrodes whereby the current collected by the central electrode on ionization of the ionizable medium will be a periodically varying current that will vary in amplitude in accordance with the ionization of the ionizable medium.

4. An ionization chamber adapted for use in detecting ionizing radiation comprising in combination, a casing, an ionizable medium in said casing under superatmospheric pressure, a pair of electrodes disposed in said casing and spaced from each other, means for placing an ionizing potential on said electrodes, conductors for conducting current from the electrodes to a point outside the ionization chamber, a third electrode disposed between said first two electrodes, means for impressing an alternating potential across the third electrode and one of the first electrodes, the other of the first electrodes being a current collecting electrode, whereby current produced by the collection of ions in the ionization chamber and flowing therefrom will be a periodically varying current.

5. An apparatus adapted for use in conducting a radioactive survey of a drill hole which penetrates the strata of the earth's surface, which comprises an ionization chamber for detecting radiations from the strata surrounding the drill hole by producing a proportional current flow therefrom, and a recorder, said ionization chamber containing a pair of electrodes, a source of potential connected across the pair of electrodes, a third electrode for controlling the ionization produced by said source of potential, a source of alternating potential connected between said third electrode and one of the other electrodes for producing a periodically varying current flow from the ionization chamber, the other of said electrodes being a current collecting electrode, means for conducting said periodically varying current resulting from the detection of radiations from the ionization chamber to the surface of the earth, and means for rectifying and recording said current in correlation with the depth at which said detection occurs.

6. A method of detecting ionizing radiation by an ionization chamber which has interposed between the conventional electrodes a grid element, that comprises the steps of subjecting the ionization chamber to ionizing radiation to produce proportional ionization of the ionizable medium carried in said ionization chamber, applying an alternating grid potential to said grid element with respect to one of said conventional electrodes to impede the collection of ions at the other of said conventional electrodes during alternate one-half cycles of the alternating grid potential whereby the output current from the ionization chamber will be a periodically varying current.

7. A method of detecting ionizing radiation by an ionization chamber which has interposed between the conventional electrodes a grid element that comprises the steps of subjecting the ionization chamber to ionizing radiation to produce proportional ionization of the ionizable medium carried in said ionization chamber, applying an alternating grid potential to said grid element with respect to one of said conventional electrodes to block the collection of ions at the other of said conventional electrodes during alternate one-half cycles of the alternating grid potential whereby the output current from the ionization chamber will be a periodically varying current.

SERGE ALEXANDER SCHERBATSKOY.

REFERENCES CITED

The following references are of record in the file of this patent:

UNITED STATES PATENTS

| Number | Name | Date |
| --- | --- | --- |
| 2,219,273 | Scherbatskoy | Oct. 22, 1940 |
| 2,361,274 | Cravath | Oct. 24, 1944 |
| 2,361,389 | Fearon | Oct. 31, 1944 |
| 2,362,164 | Silverman | Nov. 7, 1944 |

OTHER REFERENCES

"Review of Scientific Instruments," vol. II, No. 8, August 1940, pp. 267–269.